(12) United States Patent
Kaushik et al.

(10) Patent No.: US 11,427,052 B2
(45) Date of Patent: Aug. 30, 2022

(54) GLASS PANEL INTEGRATED HEATERS AND APPLICATIONS THEREOF

(71) Applicant: GM GLOBAL TECHNOLOGY OPERATIONS LLC, Detroit, MI (US)

(72) Inventors: Shailendra Kaushik, Novi, MI (US); Taeyoung Han, Bloomfield Hills, MI (US); Bahram Khalighi, Birmingham, MI (US)

(73) Assignee: GM Global Technology Operations LLC, Detroit, MI (US)

(*) Notice: Subject to any disclaimer, the term of this patent is extended or adjusted under 35 U.S.C. 154(b) by 713 days.

(21) Appl. No.: 16/360,598

(22) Filed: Mar. 21, 2019

(65) Prior Publication Data

US 2020/0298668 A1 Sep. 24, 2020

(51) Int. Cl.
*B60H 1/22* (2006.01)
*H05B 3/34* (2006.01)
*H05B 1/02* (2006.01)
*H05B 3/84* (2006.01)
*B60H 1/00* (2006.01)

(52) U.S. Cl.
CPC ....... *B60H 1/2218* (2013.01); *B60H 1/00742* (2013.01); *B60H 1/00792* (2013.01); *B60H 1/00971* (2013.01); *B60H 1/2225* (2013.01); *H05B 1/0236* (2013.01); *H05B 3/34* (2013.01); *H05B 3/84* (2013.01); *B60H 2001/2293* (2013.01); *H05B 2203/02* (2013.01)

(58) Field of Classification Search
CPC .............. B60H 1/2218; B60H 1/00742; B60H 1/00792; B60H 1/00971; B60H 1/2225; B60H 1/2215; B60H 2001/2293; H05B 1/0236; H05B 3/34; H05B 3/84; H05B 3/22; H05B 3/845; H05B 3/86; H05B 3/42; H05B 3/46; H05B 3/48; H05B 2203/05; H05B 2203/002; H05B 2203/013; H05B 2203/008; H05B 2203/011; H05B 2203/031; H05B 2214/02

See application file for complete search history.

(56) References Cited

U.S. PATENT DOCUMENTS

| 4,805,070 A * | 2/1989 | Koontz | B60S 1/0822 361/286 |
| 5,040,411 A * | 8/1991 | Medzius | B60S 1/0822 73/73 |
| 5,446,576 A * | 8/1995 | Lynam | B60R 1/02 359/267 |
| 6,051,820 A | 4/2000 | Poix et al. | |
| 10,690,391 B2 * | 6/2020 | Millett | H05B 3/84 |

(Continued)

FOREIGN PATENT DOCUMENTS

| CN | 1277650 A | 12/2000 |
| CN | 101633821 A | 1/2010 |

(Continued)

*Primary Examiner* — Shawntina T Fuqua
(74) *Attorney, Agent, or Firm* — Quinn IP Law

(57) ABSTRACT

A glass panel apparatus is provided. The glass panel apparatus includes an outer glass pane comprising a low-e coating on a side facing the inner glass pane, an inner glass pane comprising a low-e coating on a side facing the outer glass pane, a gap between the inner glass pane and the outer glass pane, the gap comprising a vacuum, and a heating element configured to heat the inner glass pane.

17 Claims, 3 Drawing Sheets

(56) References Cited

U.S. PATENT DOCUMENTS

| | | | |
|---|---|---|---|
| 10,739,292 B1* | 8/2020 | Melcher | H05B 3/18 |
| 2008/0237219 A1 | 10/2008 | Takeuchi | |
| 2016/0121993 A1* | 5/2016 | Nehring | H05B 3/34 |
| | | | 244/118.5 |

FOREIGN PATENT DOCUMENTS

| | | |
|---|---|---|
| CN | 201883039 U | 6/2011 |
| DE | 69819247 T2 | 8/2004 |
| DE | 102008034748 A1 | 1/2010 |
| KR | 20120028708 A | 3/2012 |

\* cited by examiner

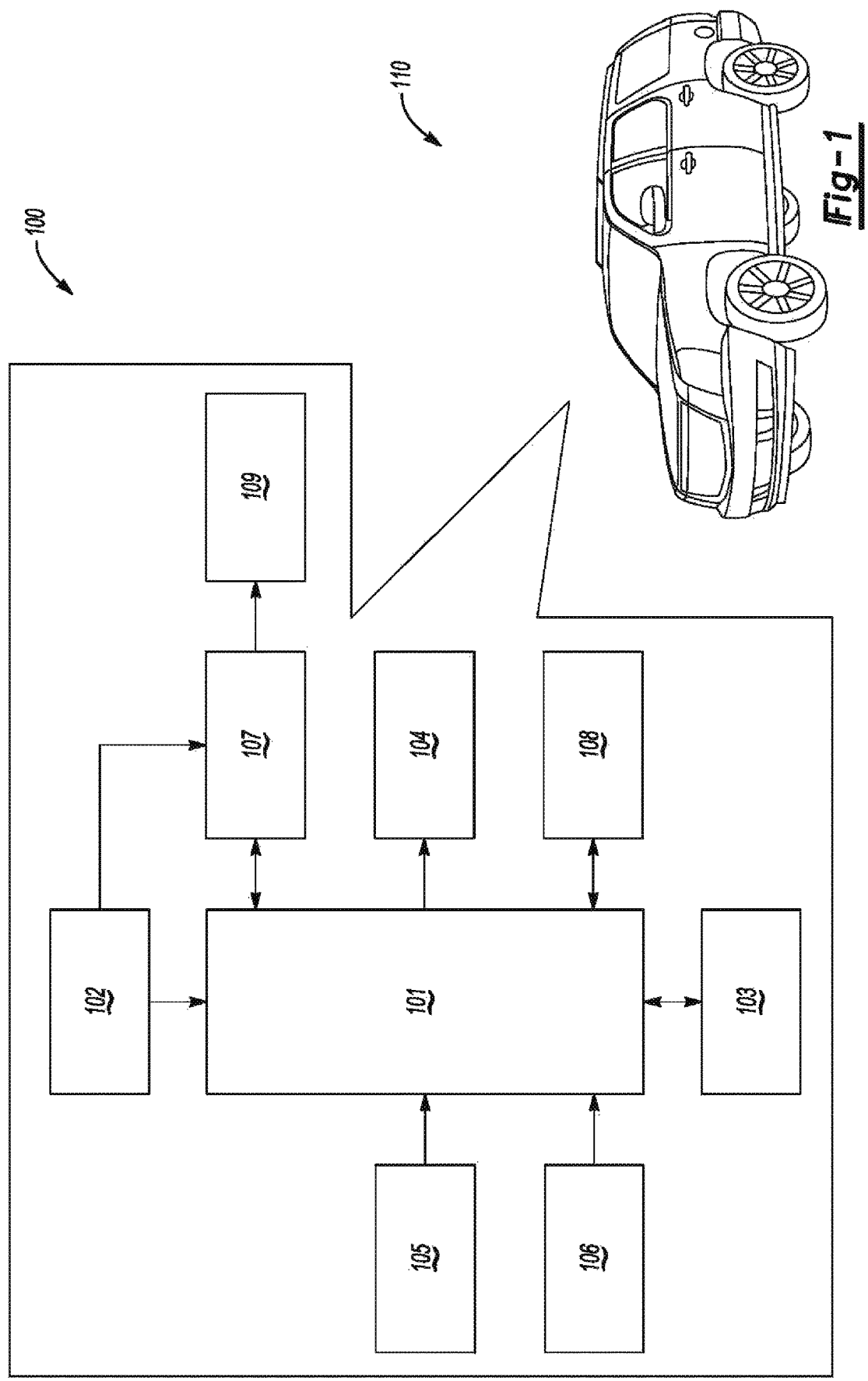

GLASS PANEL INTEGRATED HEATERS AND APPLICATIONS THEREOF

CROSS REFERENCE TO RELATED APPLICATIONS

The present application is related to U.S. application Ser. No. 16/287,062 entitled Positive Temperature Coefficient Heaters and Contact Applications Thereof filed on Feb. 27, 2019 and U.S. application Ser. No. 16/286,881 entitled Positive Temperature Coefficient Heaters and Radiant Applications Thereof filed on Feb. 27, 2019, the disclosures of which are hereby incorporated herein in their entirety.

INTRODUCTION

Apparatuses and methods consistent with exemplary embodiments relate to configurations of radiant heating devices. More particularly, apparatuses and methods consistent with exemplary embodiments relate to the integration of radiant heaters in glass panels.

SUMMARY

One or more exemplary embodiments provide a glass panel apparatus with an integrated heater. More particularly, one or more exemplary embodiments provide a glass panel apparatus with an integrated heater configured for a window or a moonroof and sunroof.

According to an aspect of an exemplary embodiment, a glass panel apparatus is provided. The apparatus includes an outer glass pane comprising a low-e coating on a side facing the inner glass pane, an inner glass pane comprising a low-e coating on a side facing the outer glass pane, a gap between the inner glass pane and the outer glass pane, the gap comprising a vacuum, and a heating element configured to heat the inner glass pane The heating element may include one from among a positive temperature coefficient (PTC) heating element and two bus bars in parallel connected to a tin oxide coating on the inner glass pane.

The apparatus may include a power controller configured to generate and apply a pulse width modified signal to the heating element.

The apparatus may include a controller configured to control to adjust a current or frequency of the pulse width modified signal of the power controller according to one or more from among a setting parameter and a profile information.

The setting parameter may include one or more from among a setting input by an occupant, a pre-calibrated setting corresponding to a location of the glass panel, a temperature of a space, and a surface temperature of a surface into which the heating element is integrated.

The setting parameter may include a thermal comfort value and an optimal power consumption value.

The setting parameter may include an equivalent homogenous temperature.

The profile information may include a profile of an occupant that is occupying a space corresponding to the heating element. The profile information of the occupant may include information on temperature preferences of the occupant or heating element intensity preferences of the occupant.

The apparatus may include a communication device configured to receive the setting parameter from one or more from among a plurality of sensors.

The communication device may be further configured to receive the profile information from one or more of a server and a mobile device.

The user input may be configured to provide the setting parameter to the controller.

The apparatus may further include a storage configured to store the setting parameter and the profile information.

The heating element may include a positive temperature coefficient (PTC) heating element, and the PTC heating element comprises a flexible substrate and carbon-based ink.

The PTC heating element may comprise a ceramic material or silicon rubber.

The PTC heating element may be integrated into the inner glass pane

The glass panel may be integrated into a vehicle window.

The glass panel may be integrated into a vehicle sunroof or vehicle moonroof

The low-e coating may include one or more from among fluorinated tin dioxide and silver.

Other objects, advantages and novel features of the exemplary embodiments will become more apparent from the following detailed description of exemplary embodiments and the accompanying drawings.

BRIEF DESCRIPTION OF THE DRAWINGS

The disclosed examples will hereinafter be described in conjunction with the following drawing figures, wherein like numerals denote like elements, and wherein:

FIG. 1 shows a block diagram of a glass panel apparatus according to an exemplary embodiment;

DETAILED DESCRIPTION

Figure 2A:
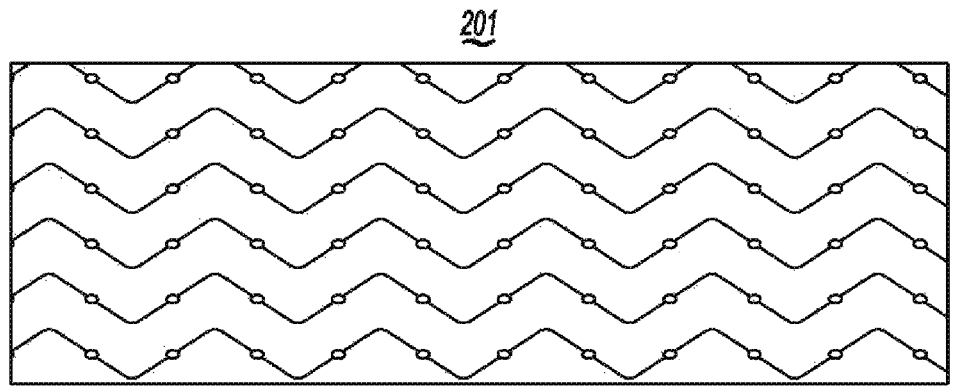
FIGS. 2A and 2B show illustrations of a positive temperature coefficient heating element and a graph illustrating a comparison of sunroof temperatures with and without the glass panel apparatus according several aspects of exemplary embodiments.

A heating apparatus will now be described in detail with reference to FIGS. 1-3 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

Most vehicles are equipped with a heating core and blower that forces air through the heating core to transfer heat from the coolant in the heating core to the cabin air system. The heating core and blower heating system requires vents and fans which take up space in the vehicle. Moreover, with the development of electric vehicles, engines and engine coolant will no longer be required in vehicles. Thus, an alternative apparatus for heating a vehicle or vehicle components and providing occupant comfort will be required.

In many current vehicles, seats and steering wheels are heated by resistance heaters. One type of heater is a positive temperature coefficient (PTC) heating element. A PTC heating element turns electrical energy into heat and may be flexible allowing for various types of integrations. Further, the resistance of the PTC heating element increases as temperature increases thereby effectively regulating the temperature of the surface into which the PTC heating element is integrated. The aforementioned features of the PTC heating element make it possible to integrate the PTC heating element into various surfaces providing for a more comfortable occupant and for additional conveniences enabled by heated surfaces.

FIG. 1 shows a block diagram of a heating apparatus according to an exemplary embodiment. As shown in FIG. 1, the contact heating apparatus 100, according to an exemplary embodiment, includes a controller 101, a power supply 102, a storage 103, an output 104, a sensor 105, a user input 106, a power controller 107, a communication device 108 and a heating element 109. However, the contact heating apparatus 100 is not limited to the aforementioned configuration and may be configured to include additional elements and/or omit one or more of the aforementioned elements. The contact heating apparatus 100 may be implemented as part of a vehicle, as a standalone component, or as a hybrid between an on vehicle 110 and off vehicle device.

The controller 101 controls the overall operation and function of the contact heating apparatus 100. The controller 101 may directly or indirectly control one or more of a power supply 102, a storage 103, an output 104, a sensor 105, a user input 106, a power controller 107, a communication device 108 and a heating element 109, of the contact heating apparatus 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the power supply 102, the storage 103, the output 104, the sensor 105, the user input 106, the power controller 107, the communication device 108 and the heating element 109 of the contact heating apparatus 100. The information may be sent and received via a bus or network, or may be directly read or written to/from one or more of the power supply 102, the storage 103, the output 104, the sensor 105, the user input 106, the power controller 107, the communication device 108 and the heating element 109 of the contact heating apparatus 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

According to an example, the controller 101 is configured to adjust amplitude and frequency of a current or voltage of the pulse width modified signal of the power controller 107 according to one or more from among a setting parameter and profile information.

The power supply 102 provides power to one or more of the storage 103, the output 104, the sensor 105, the user input 106, the power controller 107, the communication device 108 and the heating element 109, of the contact heating apparatus 100. The power supply 102 may include one or more from among a battery, an outlet, a capacitor, a solar energy cell, a generator, a wind energy device, an alternator, etc.

The storage 103 is configured for storing information and retrieving information used by the contact heating apparatus 100. The information may include information setting parameter or profile information. The setting parameter may include one or more from among a setting input by an occupant via user input 106, a pre-calibrated prestored setting corresponding to a location of the heating element 109, a temperature of a space recorded by a sensor 105, and a temperature of the heating element recorded by a sensor 105.

The optimal power consumption value is a minimum power consumption value corresponding to thermal comfort value of an occupant. The minimum power consumption value is achieved by coordinating settings of HVAC components to provide a desired or maximum thermal comfort value and determining all of the various combination of settings of the HVAC components that consume the least amount of power for the desired or maximum thermal comfort value of an occupant. Thermal comfort is an occupant comfort rating at a given equivalent homogenous temperature or for a given combination of settings of the HVAC components.

The profile information may be a profile of an occupant. For example, the profile information may be a profile of an occupant that is occupying a space or near a surface corresponding to the heating element. The profile information of the occupant may include information on desired thermal comfort value of the occupant for a given season, weather, time of day, etc., temperature preferences of the occupant or heating element intensity preferences of the occupant.

The storage 103 may be controlled by the controller 101 to store and retrieve information received from one or more sensors 105 as well as computer or machine executable instructions to control the heating element 109. The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the contact heating apparatus 100. The output 104 may include one or more from among a speaker, audio, a display, a centrally-located display, a head up display, a windshield display, a haptic feedback device, a vibration device, a tactile feedback device, a tap-feedback device, a holographic display, an instrument light, an indicator light, etc.

The output 104 may output notification including one or more from among an audible notification, a light notification, and a display notification. The notification may include information notifying of the activation or deactivation of the heating element 109 or the contact heating apparatus 100. The output 104 may also display image and information provided by one or more sensors 105. The output 104 may display a graphic illustrating positions of the heating elements 109 and indicating their statuses, e.g., on, off, power setting, etc.

The sensor 105 may include one or more from among a thermometer, a power sensor, and a temperature sensor. The power sensor may be a current sensor, voltage sensor, or other sensor detect the current or other power value of the signal being output to the heating element 109.

The user input 106 is configured to provide information and commands to the contact heating apparatus 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a touchpad, etc. The user input 106 may be configured to receive a user input to acknowledge or dismiss the notification output by the output 104. The user input 106 may also be configured to receive a user input to activate or deactivate the contact heating apparatus 100.

The power controller 107 may include circuitry including a signal generator such as a pulse generator (e.g., a solid-state pulse generator) and an amplifier. In addition, the power controller 107 may include a direct current to direct current convertor and pulse generator such as a solid-state pulse generator. According to one example, the power controller may include transformer configured to convert AC power supplied by the power supply to an AC voltage and frequency to power the heating element 109. According to another example, the power controller may include a direct current (DC) to DC converter configured to convert the power supplied by the power supply to an appropriate voltage and frequency to power the heating element 109. According to yet another example, the power controller may be configured to convert current, voltage, waveform, and frequency of electricity inputs and generate an output signal according to the converted current, voltage, waveform, and frequency for the heating element 109.

The communication device 108 may be used by contact heating apparatus 100 to communicate with several types of external apparatuses according to various communication methods. The communication device 108 may be used to send/receive various information such as setting parameter and a profile information for operating the contact heating apparatus 100 to/from the controller 101 from/to various external device such as phones, USB devices, etc.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, EVDO, CDMA, GPRS, EDGE or ZigBee.

The heating element 109 is an electrical device that generates heat when an electrical current is passed through the element. In one example, the heating element 109 may be a coating of tin-oxide to an inside of the inner-pane. The tin-oxide coating may be transparent and conduct electricity that is applied through two busbars in parallel and applied to opposing edges on the same side of the glass pane. Electric current flows across the tin-oxide coating from one busbar to the other. The electrical resistance of the coating produces heat energy, which radiates from the glass. The busbars are connected to power controller 107 that regulates the flow of electricity and thus the temperature of the glass.

Alternatively, the heating element may be a positive thermal coefficient (PTC) heating element that is self-regulating and self-limiting because the electrical resistance of the element increases as the element's temperature rises. In particular, PTC heating element 109 may be a flexible substrate including a printed ink or rubber. In another example, The PTC heating element 109 may comprise ceramic, silicon rubber or carbon-based ink applied to a plastic film.

Figure 2B:
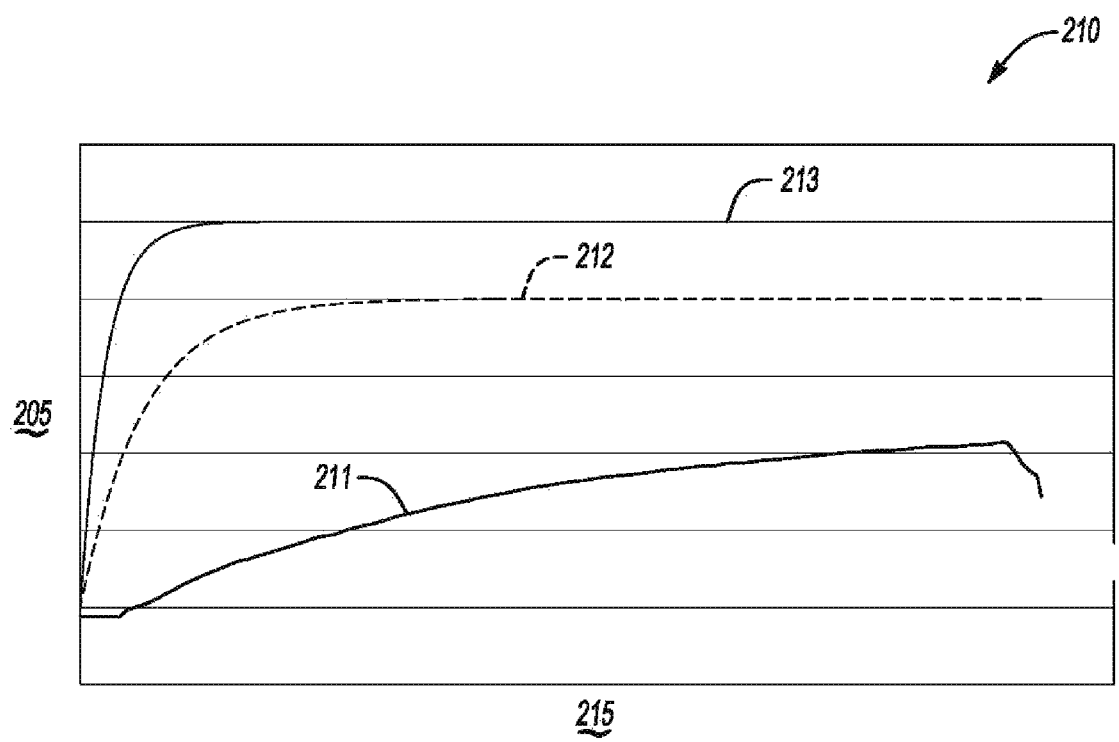

FIGS. 2A and 2B show illustrations of a positive temperature coefficient heating element and a graph illustrating a comparison of sunroof temperatures with and without the glass panel apparatus according several aspects of exemplary embodiments.

Referring to FIG. 2A, a flexible PTC heating element 201 is shown. The PTC heating element 201 includes a pattern printed onto a substrate that is connected to two electrodes configured to receive power. The application of power to the electrodes causes the printed pattern to radiate heat.

The exemplary embodiment illustrated in graph 210 shows comparison of sunroof temperatures with and without the glass panel apparatus. In particular, the y-axis shows the sunroof temperature and x-axis represents time in seconds.

The lines on the graph represent the sunroof temperature of a vehicle that is cooled to −20 degrees Celsius. Line 211 shows sunroof temperature without the heating element in a glass panel, which barely crosses the 20-degree Celsius threshold when the vehicle is heated with blowers without radiant heaters. Line 212 shows the glass temperature being heated to 60 degrees Celsius in a little over 1000 seconds and line 213 shows the glass temperature being heated to 80 degrees Celsius in in a little over 500 seconds. The speed of heating and maximum glass temperature can be set according to one or more of profile information and a setting parameter.

Figure 3:
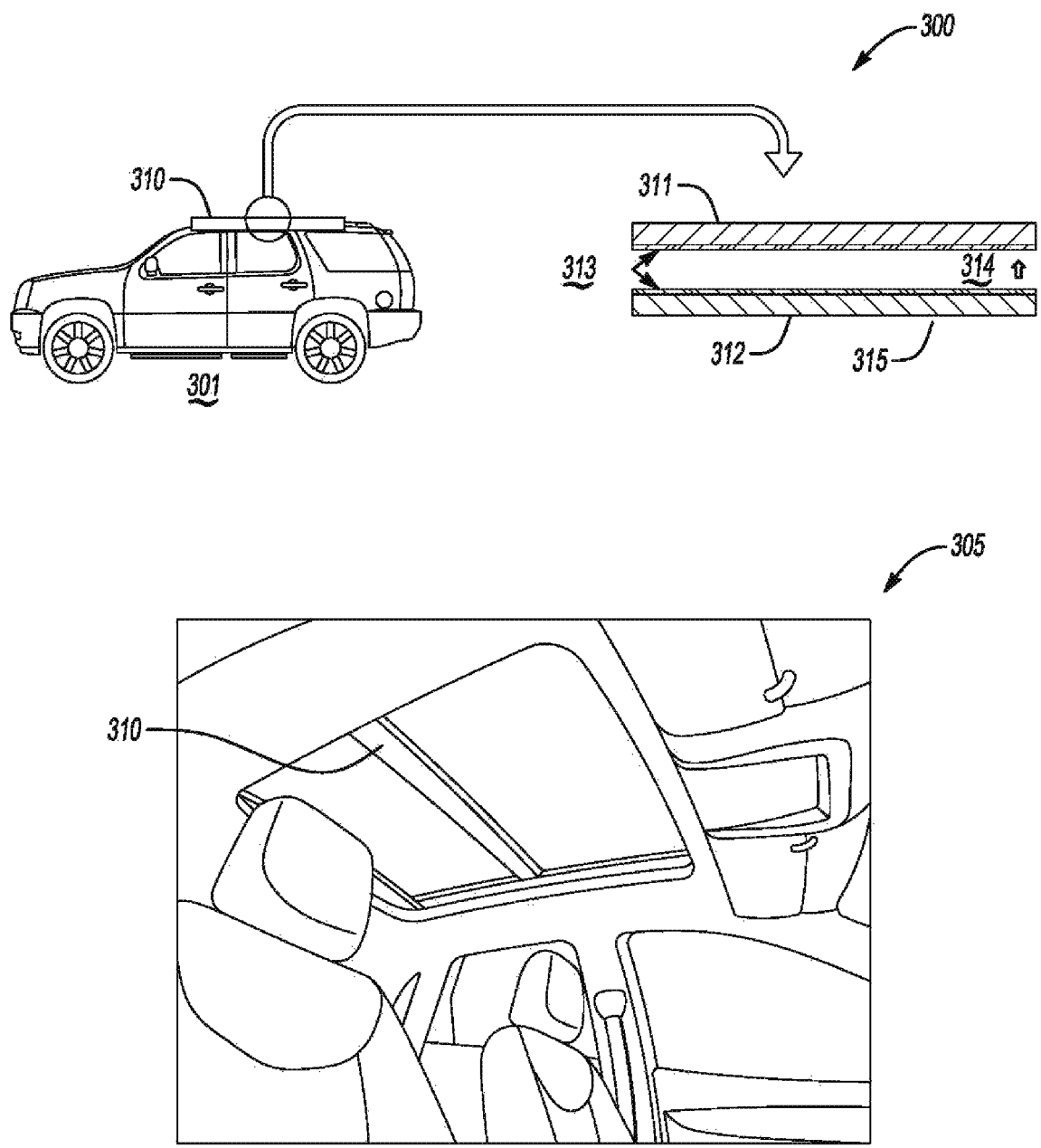
FIG. 3 shows an illustration of a glass roof with the glass panel apparatus according to an exemplary embodiment.

FIG. 3 shows an illustration of a glass roof with the glass panel apparatus according to an exemplary embodiment.

Referring to FIG. 3, illustrations of PTC heating element 109 integrated into a glass panel 300 of a vehicle 301 is shown. In this example, the glass panel is that of a sunroof or moonroof 310.

The glass panel 310 includes an outer glass pane 311 and an inner glass pane 312. A low-e coating 313 is disposed on one or more from among the outer glass pane 311 and the inner glass pane 312 is shown. A gap 314 including a vacuum may separate and be disposed in between the outer glass pane 311 and the inner glass pane 312. The low-e coating 313 may be on a side of the glass panes facing the gap. For example, the low-e coating on the outer glass pane 311 may be on a side facing the inner glass pane 312 and the low-e coating on the inner glass pane 312 may be on a side facing the outer glass pane 311

The inner glass pane 312 may include an integrated heater 315. The integrated heater 315 may comprise a microscopic coating of Tin-oxide to an inside of the inner-pane. The Tin-oxide coating may be transparent and conduct electricity from two busbars disposed in parallel on opposing edges on the same side of the glass pane.

Alternatively, the integrated heater 315 may be the PTC heating element. The PTC heating element may be adhered or fastened to an inner or outer side of the inner glass pane 312. Alternatively, the heating element 109 may be adhered to an inner side of the outer glass pane 311.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A glass panel apparatus configured to be installed in a vehicle, the glass panel apparatus comprising:
   an outer glass pane comprising a low-e coating on a side facing the inner glass pane;
   an inner glass pane comprising a low-e coating on a side facing the outer glass pane;
   a gap between the inner glass pane and the outer glass pane, the gap comprising a vacuum;
   a heating element configured to heat the inner glass pane;
   a power controller configured to generate and apply a pulse width modified signal to the heating element;
   a controller configured to control to adjust a current or frequency of the pulse width modified signal of the power controller according to one or more from among a setting parameter and a profile information; and
   an output;
   wherein the setting parameter include one or more of a setting input by an occupant, a pre-calibrated setting corresponding to a location of the glass panel, a temperature of a space, and a surface temperature of a surface into which the heating element is integrated; and
   wherein the output includes information notifying of activation or deactivation of the heating element in haptic form.

2. The apparatus of claim 1, wherein the heating element comprises one from among a positive temperature coefficient (PTC) heating element and two bus bars in parallel connected to a tin oxide coating on the inner glass pane.

3. The apparatus of claim 1, wherein the setting parameter comprises one or more from among a setting input by an occupant, a pre-calibrated setting corresponding to a location of the glass panel, a temperature of a space, and a surface temperature of a surface into which the heating element is integrated.

4. The apparatus of claim 1, wherein the setting parameter comprises a thermal comfort value and an optimal power consumption value.

5. The apparatus of claim 1, wherein the setting parameter comprises an equivalent homogenous temperature.

6. The apparatus of claim 1, wherein the profile information comprises a profile of an occupant that is occupying a space corresponding to the heating element.

7. The apparatus of claim 6, wherein the profile information of the occupant comprises information on temperature preferences of the occupant or heating element intensity preferences of the occupant.

8. The apparatus of claim 1, further comprising a communication device configured to receive the setting parameter from one or more from among a plurality of sensors.

9. The apparatus of claim 8, wherein the communication device is further configured to receive the profile information from one or more of a server and a mobile device.

10. The apparatus of claim 1, further comprising a user input configured to provide the setting parameter to the controller.

11. The apparatus of claim 1, further comprising a storage configured to store the setting parameter and the profile information.

12. The apparatus of claim 1, wherein the heating element comprises a positive temperature coefficient (PTC) heating element, and wherein the PTC heating element comprises a flexible substrate and carbon-based ink.

13. The apparatus of claim 12, wherein the PTC heating element comprises a ceramic material or silicon rubber.

14. The apparatus of claim 12, wherein the PTC heating element is integrated into the inner glass pane.

15. The apparatus of claim 1, wherein the glass panel is integrated into a vehicle window.

16. The apparatus of claim 1, wherein the glass panel is integrated into a vehicle sunroof or vehicle moonroof.

17. The apparatus of claim 1, wherein the low-e coating comprises one or more from among fluorinated tin dioxide and silver.

* * * * *